(12) United States Patent
Mori

(10) Patent No.: US 6,735,522 B2
(45) Date of Patent: May 11, 2004

(54) POSITION MEASUREMENT DEVICE, TERMINAL PROVIDED THEREWITH, AND POSITION MEASUREMENT METHOD

(75) Inventor: Shinichiro Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/060,161

(22) Filed: Feb. 1, 2002

(65) Prior Publication Data

US 2003/0055561 A1 Mar. 20, 2003

(30) Foreign Application Priority Data

Sep. 18, 2001 (JP) ........................................ 2001-283254

(51) Int. Cl.[7] ............................................... G01C 21/00
(52) U.S. Cl. ................... 701/214; 701/207; 342/357.06
(58) Field of Search ................................ 701/207, 213, 701/214; 340/988; 342/357.01, 357.06, 357.08

(56) References Cited

U.S. PATENT DOCUMENTS 5,442,557 A * 8/1995 Kaneko ........................ 701/213
6,484,078 B1 * 11/2002 Kageyama ..................... 701/25

FOREIGN PATENT DOCUMENTS

JP          7-218266          8/1995

* cited by examiner

*Primary Examiner*—Yonel Beaulieu
(74) *Attorney, Agent, or Firm*—Armstrong, Kratz, Quintos, Hanson & Brooks, LLP

(57) ABSTRACT

A position measurement device measures a position even in the case where the number of satellites necessary for position measurement with GPS cannot be ensured. In the case where the number of satellites necessary for position measurement cannot be acquired, a first position measurement device measures the position by finding the displacement distance from the nearest position, on the basis of three-dimensional acceleration detected by a three-dimensional acceleration sensor.

20 Claims, 9 Drawing Sheets

POSITION MEASUREMENT DEVICE, TERMINAL PROVIDED THEREWITH, AND POSITION MEASUREMENT METHOD

BACKGROUND OF THE INVENTION

1. Field of the Invention

The present invention relates to a position measurement device using GPS (global positioning system), a portable terminal provided therewith, and a position measurement method.

2. Description of the Related Art

With GPS, the earth is surrounded by 24 satellites; the distance from those satellites is measured and the location of the measurement position on the earth is calculated. Currently, GPS has a wide variety of uses such as in car navigation systems and surveying.

Meanwhile, among mobile bodies, cellular phones are spreading at an increasing rate and are used for emergency notification. It would be desirable to include a GPS function therein for that purpose, to be able to specify the location at which the emergency is occurring, and for businesses' service deployment with the knowledge of customer locations.

With car navigation systems, there are limits that the location at which power is cut off is generally same location where power is turned on, and that the vehicles do not travel off the roads. With cellular phones, on the contrar, it may often be impossible to ensure the necessary number of satellites for GPS positioning because of the cellular phones being carried to locations from which is difficult to see the sky, because of their high level of portability, and the inclusion of GPS functions in cellular phones has been obstructed.

A minimum of four satellites must be supplemented acquired in order to position a location. Three are necessary even when the altitude is set at the surface of the earth. In other words, the position cannot be calculated from a location with no direct line of sight to the minimum of three satellites. For this reason, position measurement cannot at present be done from streets with many tall buildings.

Car navigation systems or the like shift to a self-navigation mode when positioning with GPS becomes difficult. This self-navigation mode is a positioning method for calculating the distance and direction of displacement from the nearest position measured by GPS using an inclination sensor for finding the angle of the vehicle, a vehicle speed sensor for detecting the speed from the rotation of the tires, and a uniaxial gyro for detecting displacement to either side.

However, in the case of portable terminals (mobile bodies) including cellular phones, unlike car navigation systems, positioning is not possible with the abovementioned self-navigation mode in car navigation systems since the mode of conveyance of the portable terminal is not fixed as with a vehicle, and can be directed vertically and horizontally. When the number of satellites necessary for measuring the portable terminal position with GPS cannot be ensured, it becomes necessary to include separate positioning means, different from the abovementioned self-navigation mode in car navigation systems, in the portable terminal.

SUMMARY OF THE INVENTION

Consequently, it is an object of the present invention to provide a position measurement device, a portable terminal provided therewith, and a position measurement method, so that positioning is possible even when the number of satellites necessary for GPS positioning cannot be ensured, in the case where a position measurement device using GPS is included in a portable terminal.

In order to achieve the abovementioned object, a first position measurement device relating to the present invention measures the position by finding the displacement distance from the nearest position on the basis of the three-dimensional acceleration detected by a three-dimensional acceleration sensor, for example, in the case where the number of satellites necessary for position measurement cannot be acquired.

Furthermore, a second position measurement device relating to the present invention measures the position by finding the displacement distance from the nearest position on the basis of the three-dimensional acceleration detected by a three-dimensional acceleration sensor, for example, and also by finding the displacement direction from the nearest position on the basis of the three-dimensional angular velocity detected by a three-dimensional gyro, for example, in the case where the number of satellites necessary for position measurement cannot be acquired (especially in the case where not even one of the satellites necessary for position measurement cannot be acquired).

Also, the present invention provides a method for determining the presence of an external magnetic field, for determining the presence of an external magnetic field other than geomagnetism on the basis of a comparison of magnetic charges detected by magnetism sensors (azimuth sensors) disposed in mutually different locations.

Furthermore, a method for determining the presence of an external magnetic field is provided, wherein a database of geomagnetic charges (reference geomagnetic charges) of measured positions is established in advance, and which determines the presence of an external magnetic field other than geomagnetism on the basis of a comparison of a magnetic charge detected by a magnetism sensor (azimuth sensor) with a reference geomagnetic charge at that location.

DESCRIPTION OF THE PREFERRED EMBODIMENTS

The preferred embodiments of the present invention are explained below according to the drawings. The technical scope of the present invention is not, however, limited by these embodiments.

Figure 1:
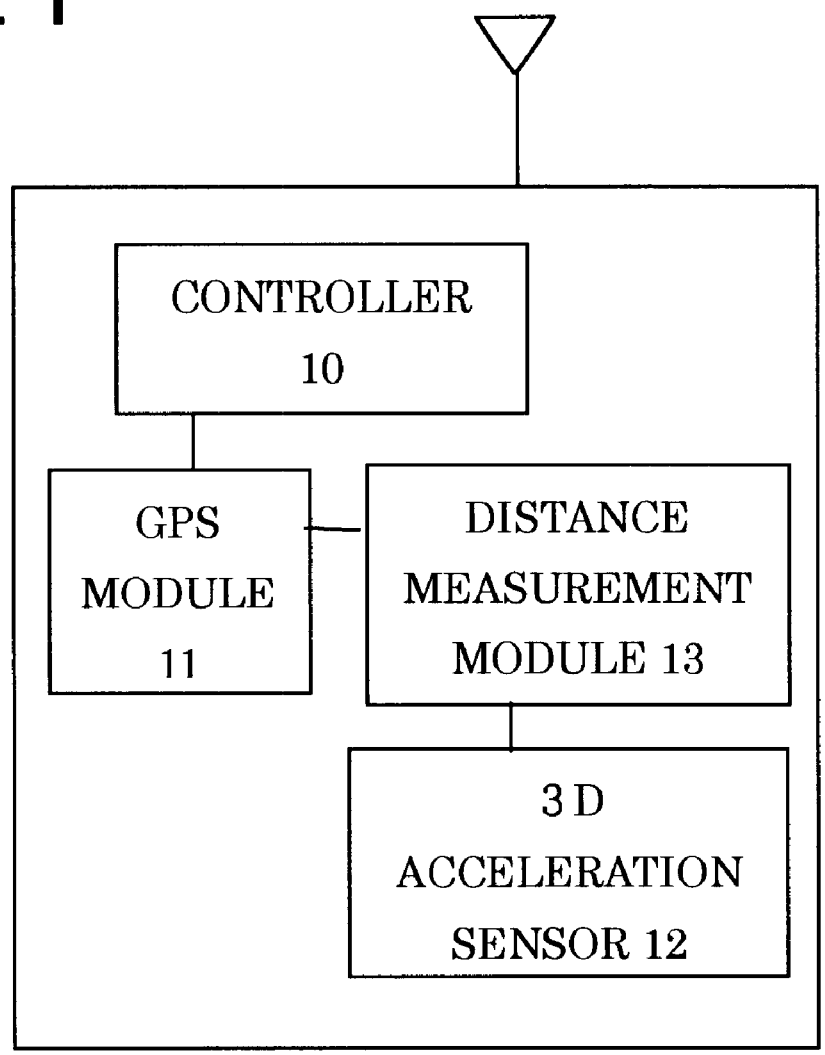
FIG. 1 is a drawing of the general constitution of a portable terminal relating to the first embodiment.

First Embodiment: When the Number of Satellites Necessary for Positioning is Short by One FIG. 1 is a drawing showing the general constitution of a portable terminal relating to the first embodiment. The portable terminal in FIG. 1 (a cellular phone, in this example) comprises a controller 10 for controlling the entire portable terminal, a GPS module 11 for executing position measurement with GPS, an acceleration sensor 12 for detecting the three-dimensional acceleration, and a distance measurement module 13 for measuring the displacement distance on the basis of the acceleration detected by the three-dimensional acceleration sensor 12. The GPS module 11, three-dimensional acceleration sensor 12, and distance measurement module 13 at least constitute the position measurement device.

The distance measurement module 13 calculates the displacement distance of the portable terminal on the basis of the acceleration detected by the acceleration sensor 12.

Figure 2A:
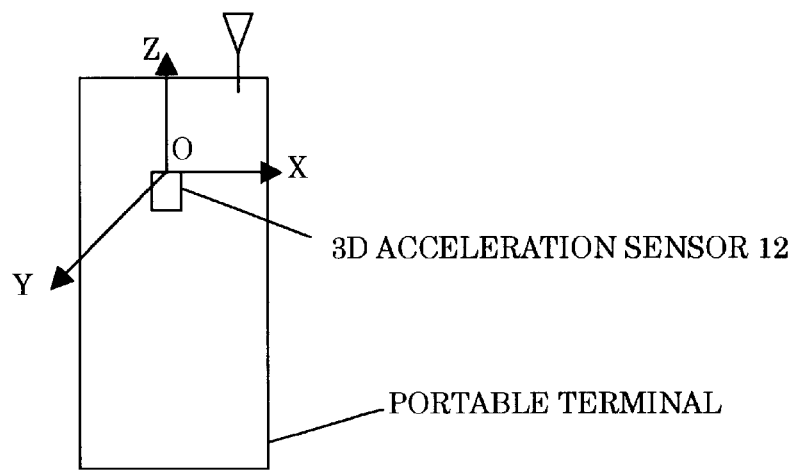
FIGS. 2A and 2B are drawings for explaining the calculation of the displacement distance of the portable terminal.
Figure 2B:
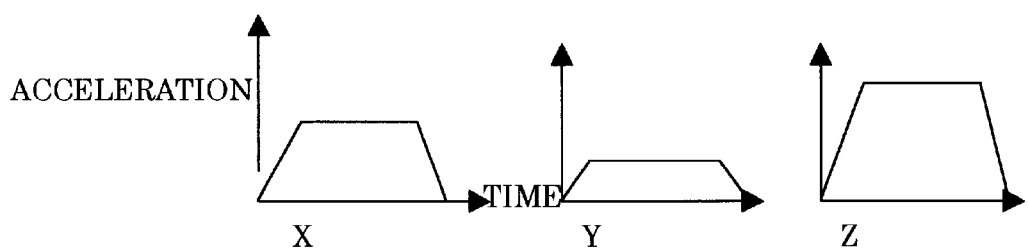

FIGS. 2A and 2B are drawings for explaining the calculation of the displacement distance of the portable terminal. As shown in FIG. 2A, the acceleration sensor 12, able to detect the three-dimensional acceleration, is established in the portable terminal. When the portable terminal is displaced during the time T, acceleration data of each directional component (X direction, Y direction, Z direction), as shown in FIG. 2B, are obtained from the acceleration sensor 12.

The displacement distance of the portable terminal can be calculated by calculating the components of the displacement distance in each of the X, Y, and Z directions from this acceleration data, and performing vector synthesis of the displacement distance components in each direction.

The displacement distance can also be approximately measured by detecting the periodic vertical oscillation as a person walks with the acceleration sensor 12 and multiplying the frequency of that oscillation (number of steps) with the step length for that person. Oscillation due to a person's walk is associated with a periodic change in acceleration and therefore, the number of the person's steps can be found by detecting that change in acceleration with the acceleration sensor 12.

In the case where the number of satellites necessary for positioning can be ensured, the GPS module 11 finds the position of the measurement point (position of portable terminal) according to the point measurement method for measuring the distance between each satellite and the measurement point. The distance L between the known position (Xi, Yi, Zi) of the satellite i and the unknown position (X, Y, Z) of the measurement point can be expressed by the following relational expression.

$$L=(X-Xi)^2+(Y-Yi)^2+(Z-Zi)^{2 1/2}=La+C\cdot\delta t \qquad (1)$$

Here, Lai is the artificial distance found by multiplying the speed of light C with the time difference of radio wave propagation between the position the satellite i and the measurement point (difference between the sending time and reception time) and is expressed as follows.

$$Lai=C\cdot(\text{reception time } Tr-\text{sending time } Ts)$$

δt is the error component of the time measured by the satellite and the time measured by the portable terminal. The sending time Ts is measured by the clock within the satellite and is sent to the portable terminal. Meanwhile, the reception time Tr is measured by the clock within the portable terminal and the portable terminal calculates the abovementioned artificial distance La. Consequently, in the case where there is an error δt in the time measured by the satellite and the time measured by the portable terminal, a dislocation occurs in the abovementioned artificial distance Lai. In order to compensate for the dislocation in the artificial distance Lai, a term for the amount of displacement, found by multiplying δt by the speed of light C, is added to the error component of the time measured by the satellite and the time measured by the portable terminal, in the abovementioned equation (1).

In the abovementioned equation (1), there are four unknown values, the position of the measurement point (X, Y, Z) and the time error δt. As a result, it is necessary to capture four satellites in order to find the measurement point. In other words, four satellites are necessary for positioning.

The position of the measurement point (X, Y, Z) can be found by setting up simultaneous equations with the abovementioned equation (1) for each satellite i and solving the following simultaneous equations (1-1), (1-2), (1-3), and (1-4).

$$(X-X1)^2+(Y-Y1)^2+(Z-Z1)^{2 1/2}=La1+C\cdot\delta t \qquad (1\text{-}1)$$

$$(X-X2)^2+(Y-Y2)^2+(Z-Z2)^{2 1/2}=La2+C\cdot\delta t \qquad (1\text{-}2)$$

$$(X-X3)^2+(Y-Y3)^2+(Z-Z3)^{2 1/2}=La3+C\cdot\delta t \qquad (1\text{-}3)$$

$$(X-X4)^2+(Y-Y4)^2+(Z-Z4)^{2 1/2}=La4+C\cdot\delta t \qquad (1\text{-}4)$$

In case where the number of satellites necessary for positioning is short by one (in the case where only three satellites can be acquired), the GPS module 11 starts the distance measurement module 13. The distance measurement module 13 calculates the displacement distance of the portable terminal from when is started, on the basis of the acceleration data from the acceleration sensor 12 at every specified positioning time. The GPS module 11 then finds the position of the measurement point (X, Y, Z) with the following simultaneous equations (2-1 through 2-4) instead of the abovementioned simultaneous equations (1-1 through 1-4).

$$(X-X1)^2+(Y-Y1)^2+(Z-Z1)^{2 1/2}=La1+C\cdot\delta t \qquad (2\text{-}1)$$

$$(X-X2)^2+(Y-Y2)^2+(Z-Z2)^{2 1/2}=La2+C\cdot\delta t \qquad (2\text{-}2)$$

$$(X-X3)^2+(Y-Y3)^2+(Z-Z3)^{2 1/2}=La3+C\cdot\delta t \qquad (2\text{-}3)$$

$$(Xp-X)^2+(Yp-Y)^2+(Zp-Z)^{2 1/2}=Ls \qquad (2\text{-}4)$$

In the abovementioned simultaneous equations (2-1 through 2-4), the equation (2-4) is applied instead of the abovementioned equation (1-4) in the case where four satellites cannot be acquired.

Xp, Yp, Zp in the equation (2-4) is the position measured at the previous positioning time (immediate measured position). Also, Ls is the displacement distance of the measurement point from the immediate measured position.

In this way, even when the number of satellites necessary for positioning is short by one, the number of equations necessary for solving the simultaneous equations can be established by using the equation (2-4) for the displacement distance of the portable terminal found from the acceleration sensor 12, and the position of the measurement point can be found by solving the abovementioned simultaneous equations (2-1 through 2-4).

Moreover, of the values X (longitude), Y (latitude), and Z (altitude), when the altitude Z is fixed as the surface of the earth, the number of the abovementioned simultaneous equations (1-1 through 1-4) and (2-1 through 2-4) can be reduced by one. In other words, the number of satellites necessary for positioning becomes three. Then, in the case where the number of satellites necessary for positioning is short by one (in the case where two satellites can be acquired), the measured position can be found using the equations for the displacement distance of the portable terminal from the acceleration sensor as discussed above.

Second Embodiment: At Least one Satellite can be Acquired

The second embodiment is explained for a positioning method using one satellite which can be acquired. In other words, the second embodiment can be applied in the case where one or two satellites can be acquired (in other words, the number of satellites necessary for positioning is short by two or three) when four satellites are necessary for positioning, or in the case where one satellite can be acquired (in other words, the number of satellites necessary for positioning is short by two) when three satellites are necessary for positioning. The present embodiment may of course be applied in the case of the first embodiment discussed above, where the number of satellites necessary for positioning is short by one.

The second embodiment can be enacted with the constitution of the portable terminal shown in FIG. 1. When the number of satellites necessary for positioning cannot be acquired, the GPS module 11 starts the distance measurement module 13, and then the distance measurement module 13 finds the position of the measurement point as follows using the displacement distance Ls found by the distance measurement module 13 on the basis of the three-dimensional acceleration data from the acceleration sensor 12.

Figure 3:
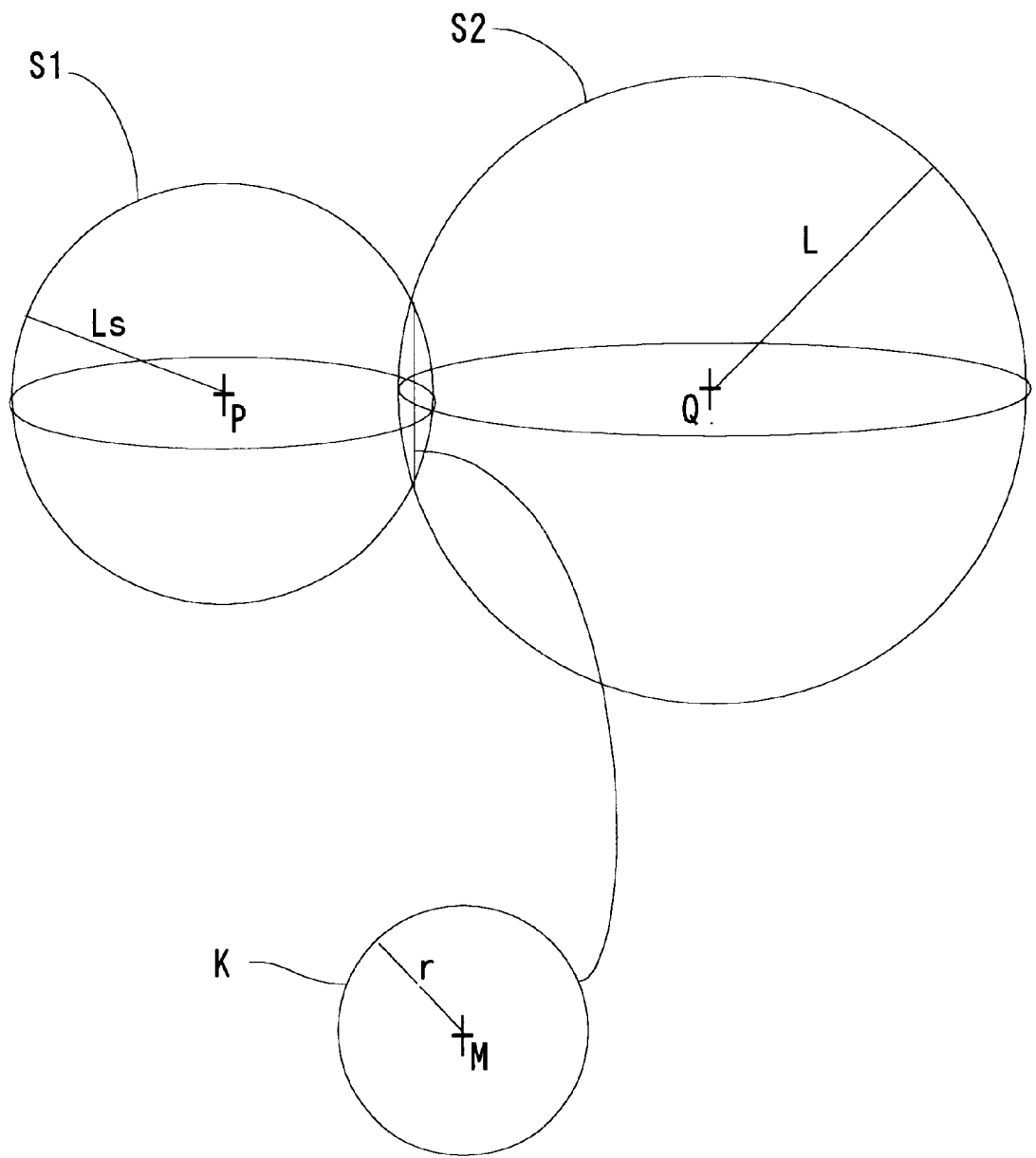
FIG. 3 is a drawing to explain the principle of the position measurement method relating to the second embodiment.

FIG. 3 is a drawing to explain the principle of the positioning method relating to the second embodiment. In FIG. 3, three dimensions are shown in two dimensions in order to simplify the drawing. In FIG. 3, the immediate measured position P (Xp, Yp, Zp) is the measured position at the previous positioning time; Ls is the displacement distance from the immediate measured position. The displacement distance Ls is distributed on the surface S1 of the sphere, having as its center the previous measured position P and a radius of the displacement distance Ls.

As discussed above, the distance L between one satellite i which could be acquired and the portable terminal is found by the following equation:

$$Distance\ L = Artificial\ distance\ La + C \cdot \delta t$$

and is distributed on the surface S2 of a sphere, having as its center the position Q of the satellite i (Xi, Yi, Zi) and a radius of the distance L.

Consequently, the measurement point is on the periphery of a circle K formed by the intersection of these two spherical surfaces S1 and S2. In the second embodiment, the GPS module 11 finds the center position M (Xm, Ym, Zm) of this circle K and takes that as the location of the measurement point. At this time, the error between the location of the measurement point and the true location becomes the radius r of this circle K. In this way, when one satellite could be acquired, the position of the measurement point can be specified with a prescribed level of precision (error of the radius of the circle K).

Third Embodiment: Not Even one Satellite can be Acquired

Figure 4:
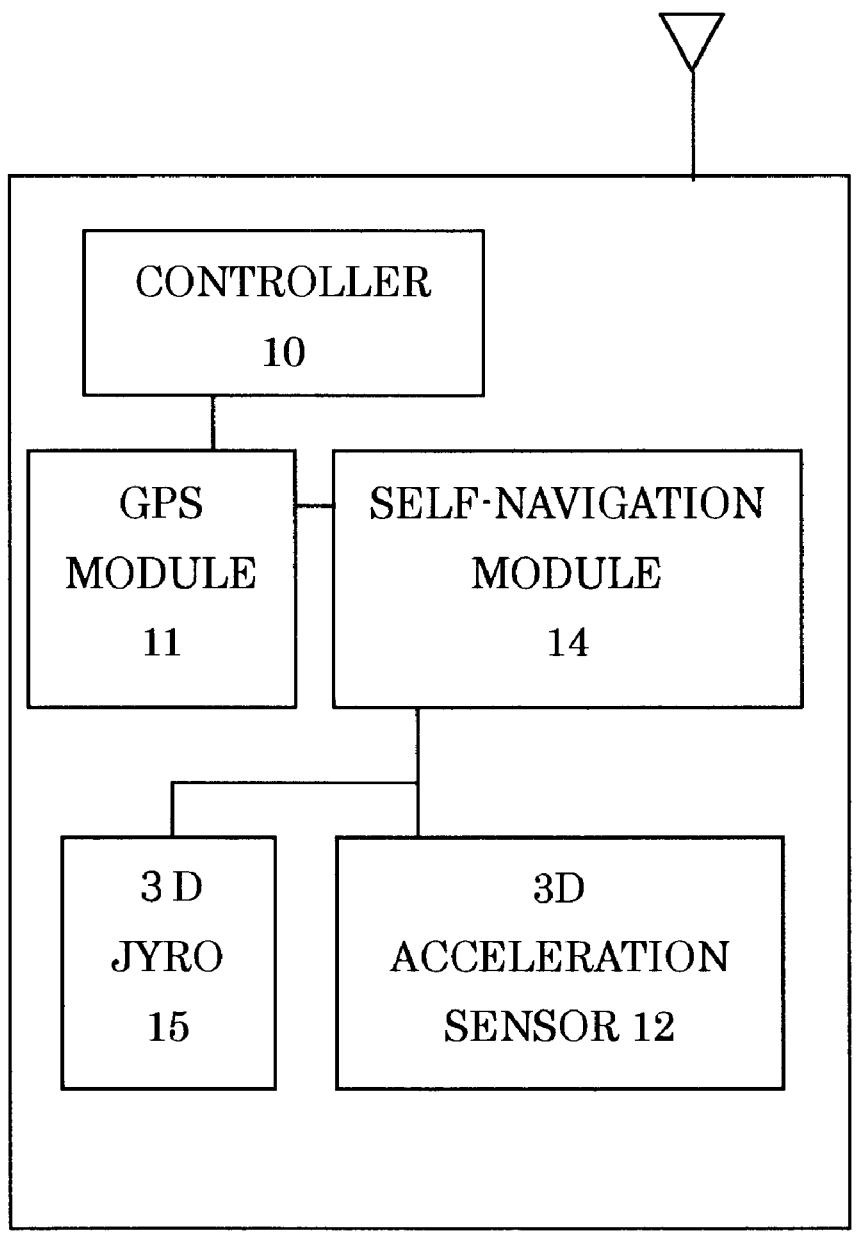
FIG. 4 is a drawing of the general constitution of a portable terminal relating to the third embodiment.

FIG. 4 shows the general constitution of a portable terminal relating to the third embodiment. The portable terminal in FIG. 4 (a cellular phone, in this example) comprises a controller 10 for controlling positioning in the portable terminal, a GPS module 11 for carrying out positioning with GPS, and a self-navigation module 14, like the constitution in FIG. 1. In the self-navigation module 14, the three-dimensional acceleration sensor 12 for detecting three-dimensional acceleration and a three-dimensional gyro (angular velocity sensor) 15 for detecting three-dimensional angular velocity are connected and find the displacement distance and displacement direction from the time when it becomes impossible to capture even one satellite. The GPS module 11, three-dimensional acceleration sensor 12, self-navigation module 14, and three-dimensional gyro 15 constitute a location measurement device.

Specifically, the self-navigation module 14 finds the displacement distance on the basis of acceleration data from the three-dimensional acceleration sensor 12, like the distance measurement module 13 in FIG. 1. Also, because of finding the angle of rotation in each dimension from the angular velocity data detected by the three-dimensional gyro 15, the self-navigation module 14 can find the displacement direction of the portable terminal from the angular velocity data. The GPS module 11 determines the location of the portable terminal on the basis of the displacement distance and displacement direction found by the self-navigation module 14 at each positioning time relative to the immediate measured position.

Moreover, it is possible to find the displacement direction on the basis of the acceleration data from the acceleration sensor 12. By vector synthesis of the displacement distance component for each dimension (direction), the displacement direction can also be obtained along with the displacement distance. However, in a comparison of the precision of the displacement direction found on the basis of the acceleration sensor 12 with that of the displacement direction found on the basis of the gyro 15, the precision of the gyro 15 is markedly greater at this point and it is preferable to find the displacement direction with the gyro 15.

In this way, with the embodiments discussed above, prescribed positioning means corresponding to the number of satellites acquired are provided, even when the number of satellites necessary for positioning cannot be acquired. Consequently, it becomes possible to track the position of the portable terminal, even when the number of satellites acquired is reduced because of the user being on a street with tall buildings or approaching an underground area.

Fourth Embodiment: Detecting External Magnetic Fields When Determining the Azimuth of the Portable Terminal at the Measurement Position As discussed above, it becomes possible to provide services utilizing position information for the portable terminal by including a GPS function in the portable terminal. For example, various types of services are considered, such as services for notifying users of facilities (restaurants, hotels, etc.) close to the location of the portable terminal.

However, in the case where the portable terminal user is receiving services utilizing such position information, the services are limited when the available information is only the position information. For example, in the case where guidance to a given destination (for example, by a voice or screen display) is considered as a service, the guidance is very difficult where only the location of the portable terminal is known. Specifically, even when guidance is provided such as "Go southward for a while on Highway 1", the portable terminal user may in some cases not know what is Highway 1. If the direction in which the portable terminal is facing at that position is known along with the position information, the direction in which the user is facing is understood and therefore it becomes possible to provide the abovementioned guidance in an easily understood form, such as "turn left on and head down this street".

In order to detect the azimuth along with the position information, it is proposed to include an azimuth sensor in the portable terminal.

The azimuth sensor is constituted by a magnetism sensor, for example. A magnetism sensor is a toroidal flux gate sensor using a toroidal coil, for example, and is sensitive to magnetic flux densities less than those of geomagnetism. Consequently, this magnetism sensor detects the geomagnetic intensity in a state where there are no external magnetic fields other than geomagnetism, and is thereby used as an azimuth sensor.

However, error is introduced to the azimuth detected by this azimuth sensor when there are external magnetic fields other than geomagnetism. External magnetic fields are caused, for example, by electromagnets (speakers, etc.), or permanent magnets (steel rod magnetized by deterioration over time, or the like). External magnetic fields with changing polarities (speakers, for example) are magnetic fields that are not present in nature and can be canceled by the use of software or hardware such as filtering circuits. On the other hand, external magnetic fields without changing polarity (for example, permanent magnets) cannot be differentiated from geomagnetism. For this reason, in the case where the portable terminal user is in a location affected by external magnetic fields, the azimuth sensor included in the portable terminal detects an incorrect azimuth because of reacting to the external magnetic fields and cannot find the correct azimuth.

In the case where the azimuth sensor cannot detect the correct azimuth in this way, it becomes impossible to provide services utilizing azimuth information and it is therefore necessary to notify the user to that effect.

In the present embodiment, therefore, the portable terminal detects for the presence of the external magnetic fields with the following type of means and does not use the azimuth detected by the azimuth sensor in the case where it is determined that external magnetic fields are present.

Figure 5A:
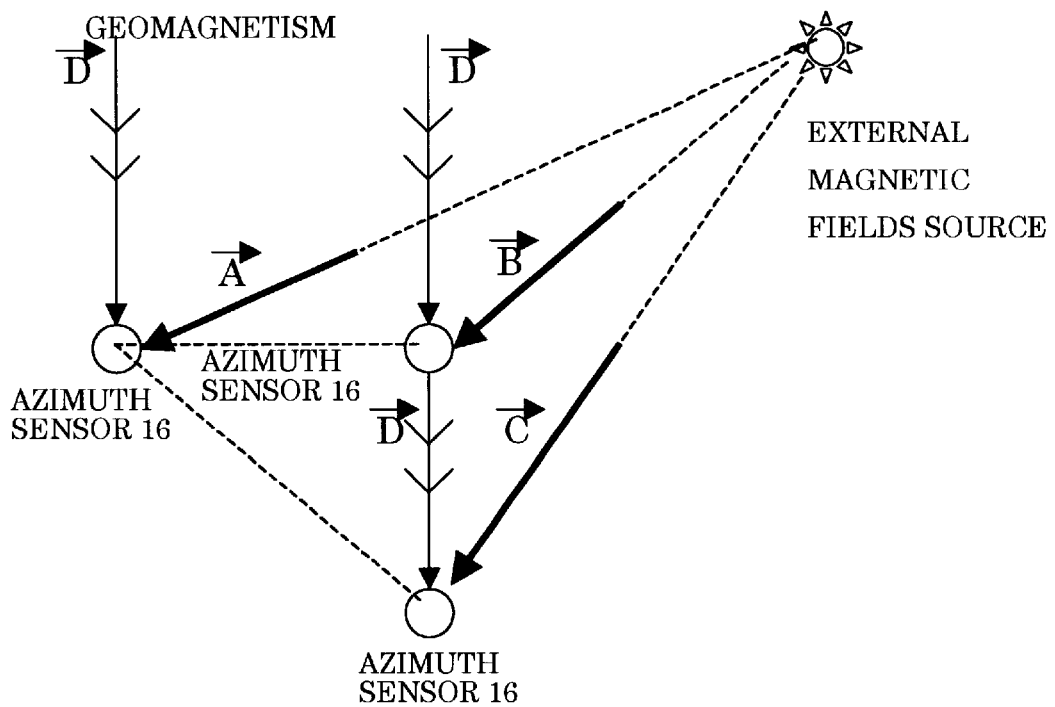
FIGS. 5A and 5B are drawings to explain the principle of detecting the presence of an external magnetic field.
Figure 5B:
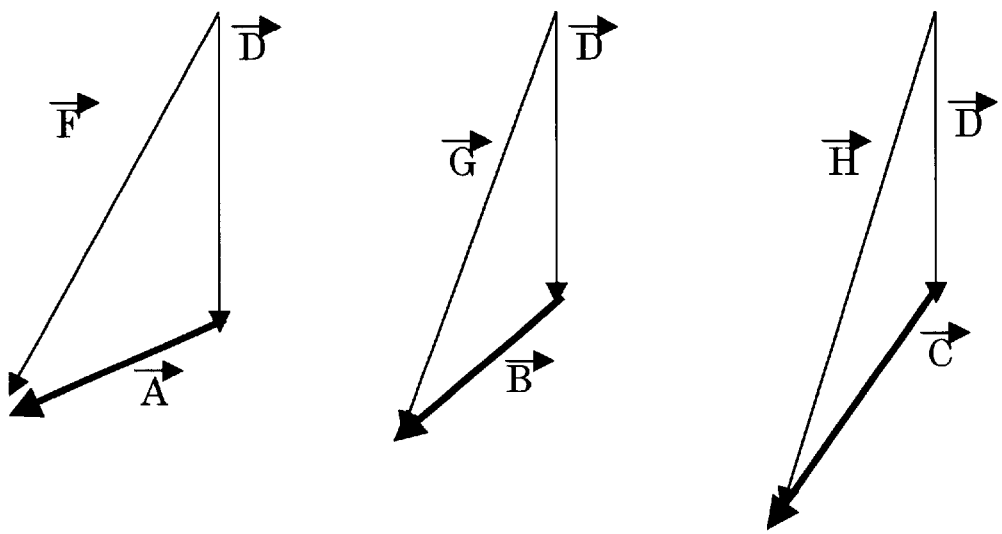

FIGS. 5A and 5B are drawings to explain the principle of detecting for the presence of the external magnetic fields. As shown in FIG. 5A, magnetic fields are detected by establishing a plurality of azimuth sensors 16 in different locations on the portable terminal (three azimuth sensors, for example, are shown in FIG. 5A). At this time, geomagnetism is the same vector D at the position of each azimuth sensor 16, but an external magnetic field becomes different vectors A, B, and C at the position of each azimuth sensor because the source of the magnetic field is at a location relatively close to the location of the portable terminal.

As shown in FIG. 5B, each of the azimuth sensors 16 detects the magnitudes of the composite vectors F, G, H of the geomagnetic vector D and the external magnetic field vectors A, B, and C. As a result, when there are external magnetic fields, there is a difference in the magnetic charges detected by each azimuth sensor. Meanwhile, when there are no external magnetic fields, the magnetic charges detected by each of the azimuth sensors 16 become the same.

Consequently, when the magnetic charges detected by each of the azimuth sensors 16 are different (in the case where the difference in the magnetic charges detected by each of the azimuth sensors is greater than or equal to a prescribed value), it can be determined that external magnetic fields are present. When the magnetic charges detected by each of the azimuth sensors 16 are approximately the same (in the case where the difference in the magnetic charges detected by each of the azimuth sensors is less than a prescribed value), it can be determined that no external magnetic fields are present.

Figure 6:
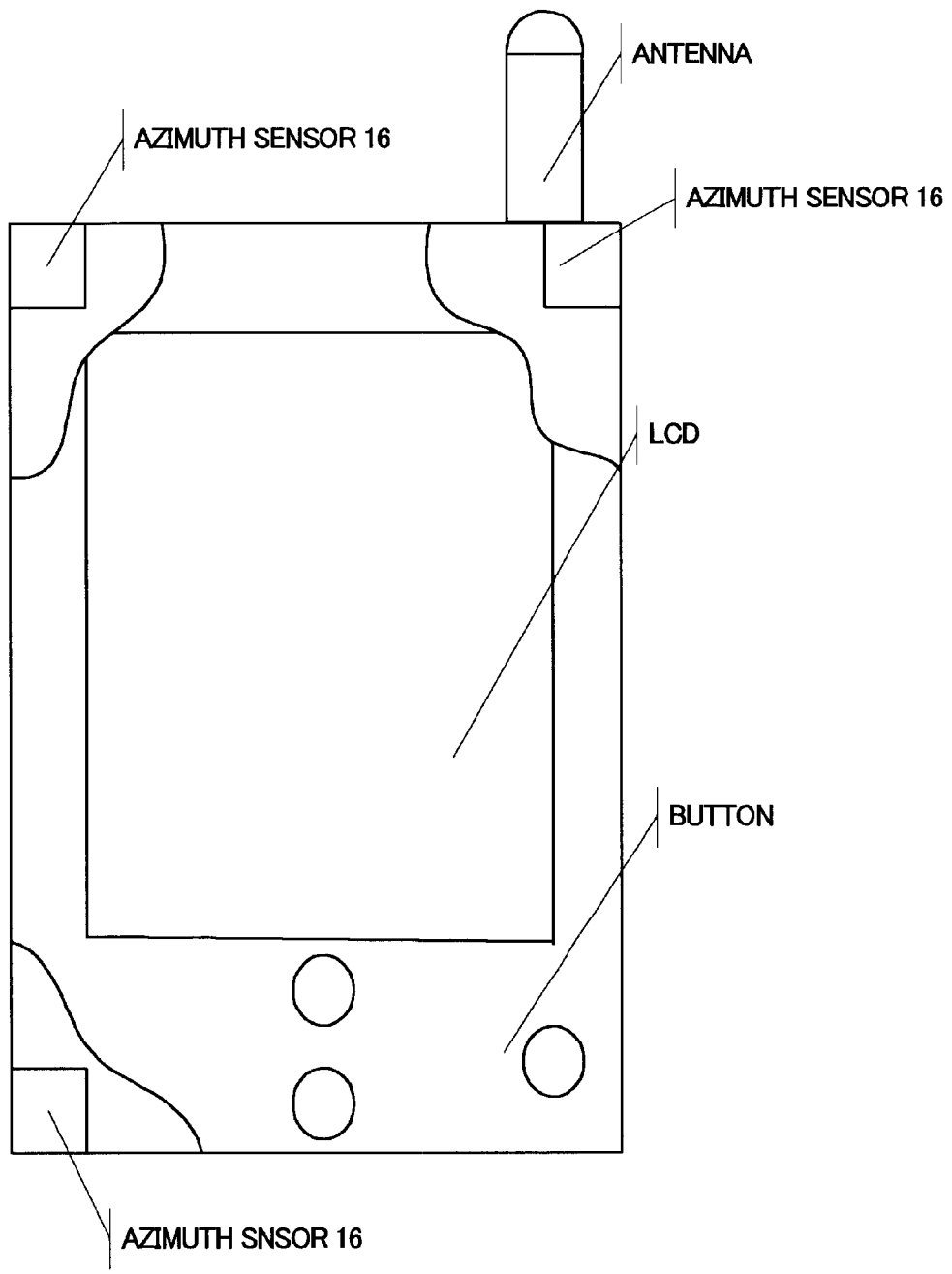
FIG. 6 is a drawing showing an example of the positioning of azimuth sensors in the portable terminal.

FIG. 6 is a drawing showing an example of the arrangement of the azimuth sensors 16 in the portable terminal. A plurality of azimuth sensors 16 are preferably disposed at locations as mutually separated as possible in the portable terminal shown in FIG. 6 (for example, a portable information terminal (PDA)). This is in order to increase the difference in the magnetic charges corresponding to the external magnetic fields. The number of azimuth sensors 16 is preferably three or more but may also be two in order to detect different magnetic charges regardless of the direction of the source of the external magnetic fields.

Figure 7:
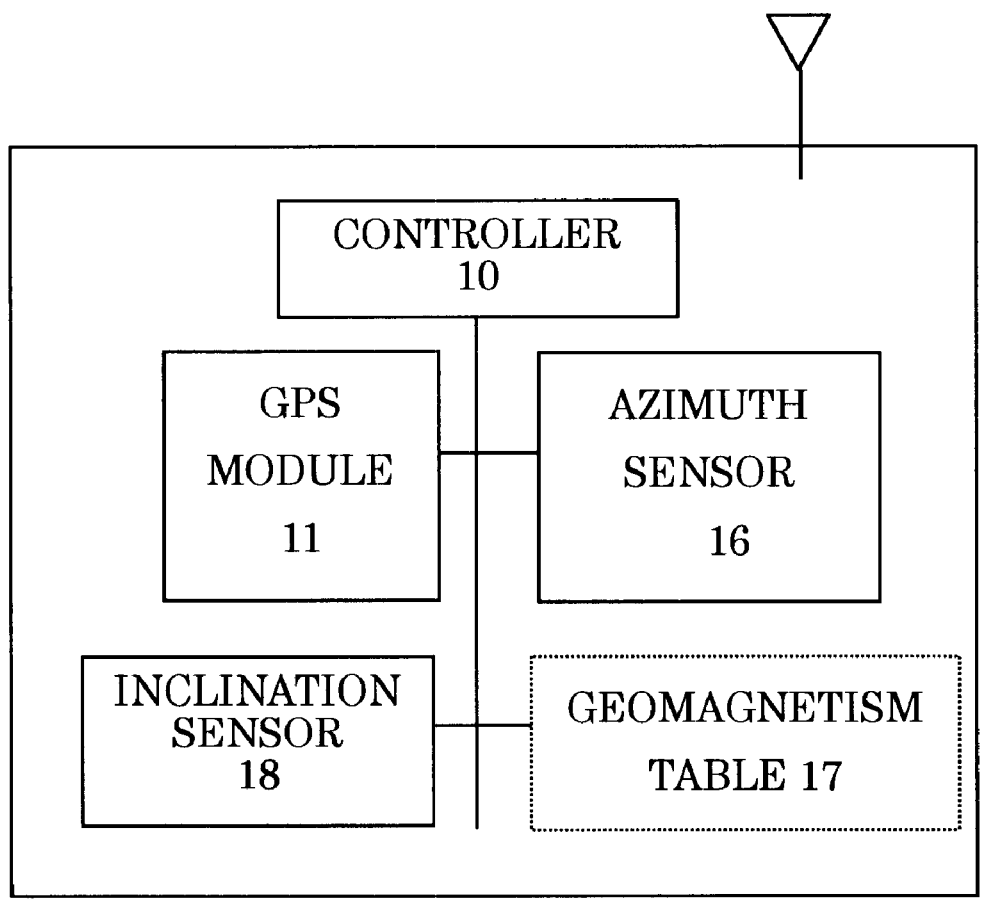
FIG. 7 is a drawing of the general constitution of the portable terminal.

FIG. 7 is a drawing showing the general constitution of a portable terminal containing azimuth sensors. Along with acquiring the current position from the GPS module 11, the controller 10 determines the presence of external magnetic fields at the measured position on the basis of the magnetic charges detected by each of the plurality of azimuth sensors 16, and determines the azimuth on the basis of the magnetic charges detected by the azimuth sensors when it is determined that there are no external magnetic fields. When it is determined that external magnetic fields are present, the azimuth is not determined. The controller 10 and azimuth sensors 16 at least constitute the azimuth measurement device. Also, as discussed below, it is possible to determine the presence of external magnetic fields with only one azimuth sensor 16. In that case, a geomagnetism table 17, discussed below, is prepared. Furthermore, the portable terminal is provided an inclination sensor 18 for detecting the angle of inclination.

Moreover, the method for determining the presence of external magnetic fields, as discussed above, is not limited to application to a portable terminal having a GPS function for measuring the position. It is possible to apply this method to any device for detecting azimuth, regardless of whether position measurement is performed. Furthermore, it is possible to apply this method to any device for detecting geomagnetism, regardless of whether azimuth detection is performed.

Furthermore, a method for determining the presence of external magnetic fields using a single azimuth sensor is explained. The geomagnetic intensities corresponding to prescribed latitudes and longitudes is already known. The geomagnetic intensities for position information such as latitude and longitude is placed in a database, and the geomagnetism corresponding to the latitude and longitude of the current position acquired by GPS is compared with the magnetic charge detected by the azimuth sensor. When the azimuth sensor detects a magnetic field of greater intensity than the geomagnetism corresponding to that location, it can be determined that external magnetic fields are present. When the magnetic charge detected by the azimuth sensor is about the same as the geomagnetism corresponding to that location, it is determined that no external magnetic fields are present.

The database (geomagnetism table) 17 of the geomagnetic intensities (reference geomagnetic intensities) corresponding to position information may be stored in the portable terminal itself, or may be prepared in a remote server connecting with the portable terminal on the network.

Figure 8:
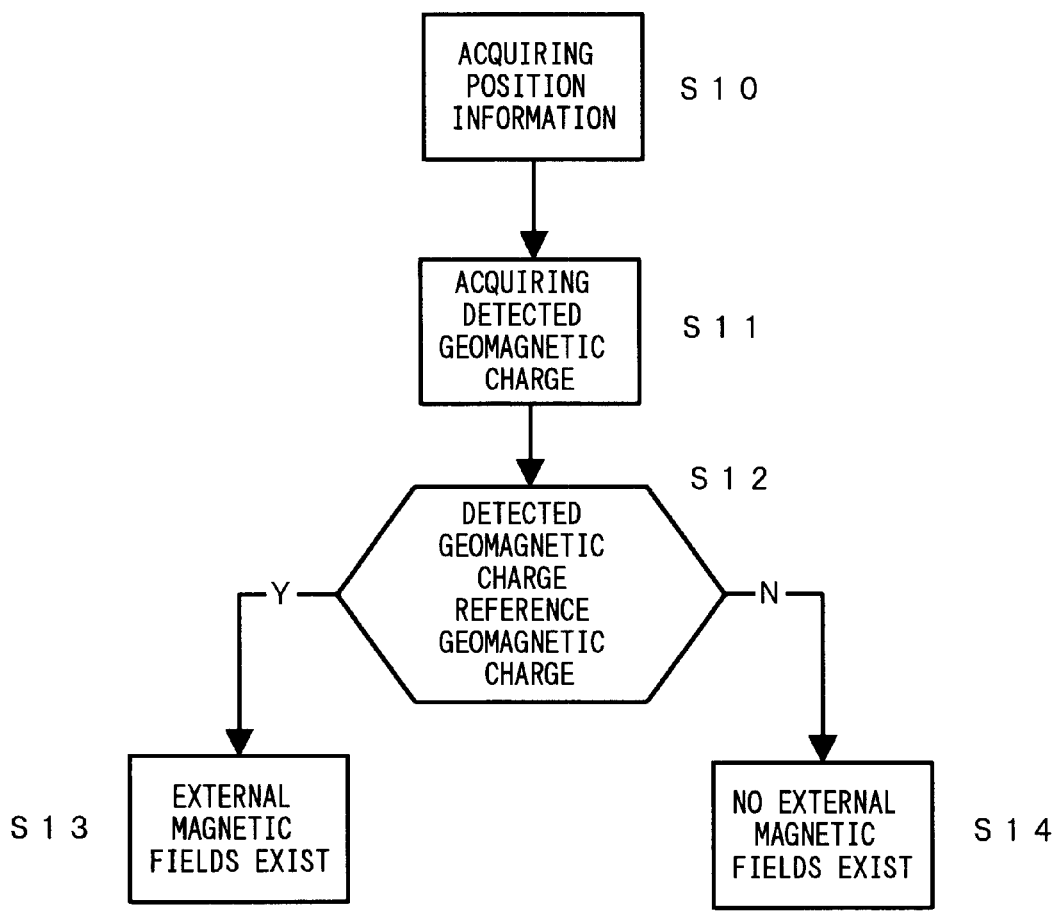
FIG. 8 is a flowchart for determining the presence of an external magnetic field in the case where the database is stored in the portable terminal itself.

FIG. 8 is a flowchart for determining the presence of external magnetic fields in the case where the database is stored in the portable terminal itself. The controller 10 of the portable terminal acquires the position information from the GPS module 11 (S10), and then acquires the magnetic charge detected by the azimuth sensor (S11). The controller then references the geomagnetism table 17 and compares the geomagnetic charge (reference geomagnetic charge), corresponding to the acquired position information, with the magnetic charge detected by the azimuth sensor (S12). When the detected magnetic charge is greater than the reference geomagnetic charge, it is determined that external magnetic fields are present (S13); when equal to or less than the reference geomagnetic charge, it is determined that external magnetic fields are not present (S14).

Figure 9:
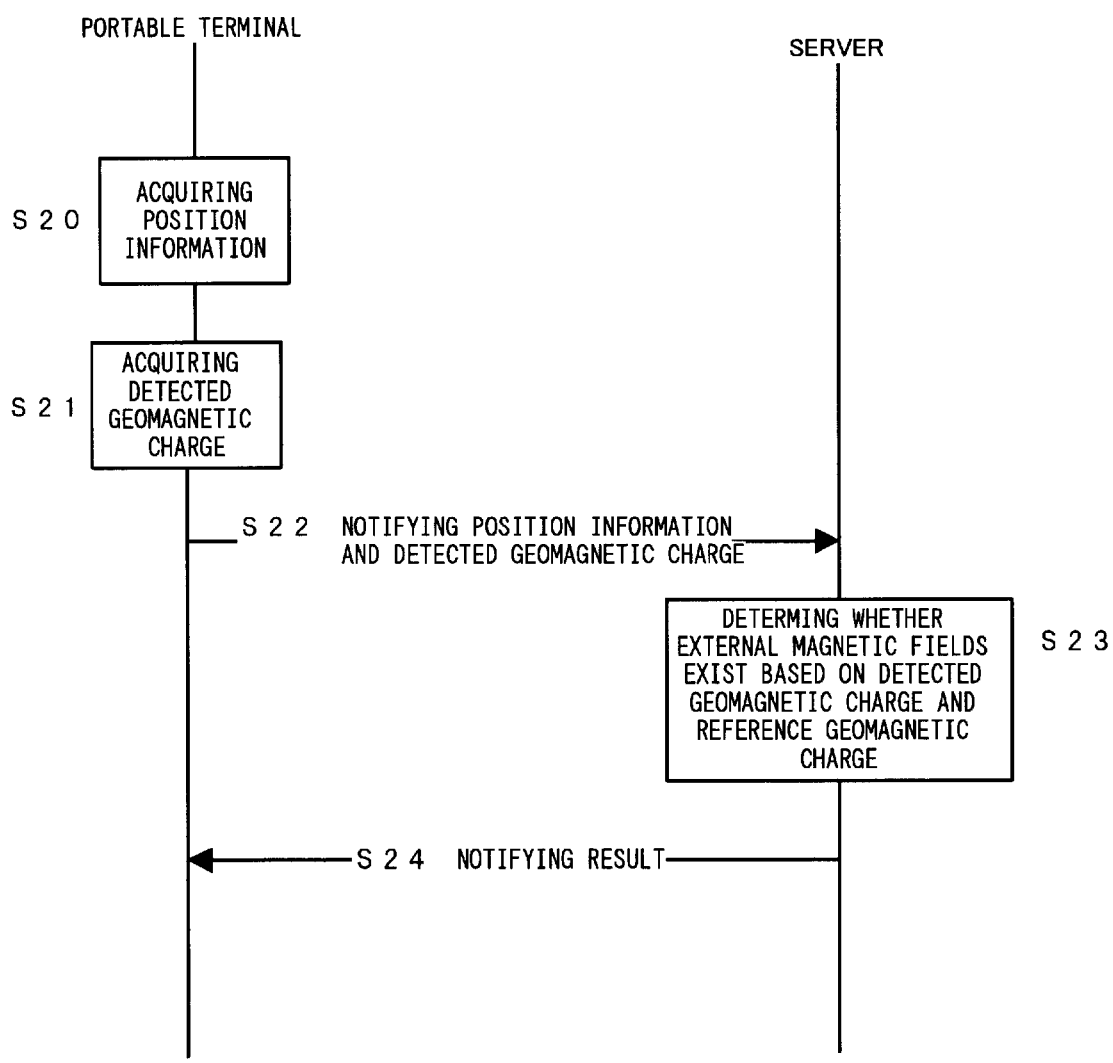
FIG. 9 is a flowchart for determining the presence of an external magnetic field in the case where the database is stored in a remote server.

FIG. 9 is a flowchart for determining the presence of external magnetic fields in the case where the database is stored in a remote server. The controller 10 of the portable terminal acquires the position information from the GPS module 11 (S20), and then acquires the magnetic charge detected by the azimuth sensor (S21). The controller then notifies the server through the network of the position information and detected magnetic charge (S22). Upon receiving the position information and detected magnetic charge, the server references the database (geomagnetism table), compares the geomagnetic charge (reference geomagnetic charge), corresponding to the position information acquired, with the detected magnetic charge, and determines whether external magnetic fields are present (S23). In other words, when the magnetic charge detected by the azimuth sensor is greater than the magnetic charge referenced from the database, it is determined that external magnetic fields are present; when less than the magnetic charge referenced from the database, it is determined that external magnetic fields are not present. The server notifies the portable terminal through the network of the results of the determination (S24). The portable terminal thereby is informed of the presence of external magnetic fields.

Moreover, even if identical to the geomagnetic charge, the magnetic charge detected by the azimuth sensor may be different because of its angle of approach. Because the angle of approach of geomagnetism with respect to the azimuth sensor becomes different because of the angle of inclination of the portable terminal, the magnetic charge detected by the azimuth sensor must be corrected to the magnetic charge at the prescribed angle when compared with the geomagnetic charge in the database. For this reason, the portable terminal includes an inclination sensor 18 for detecting its angle of inclination. The controller 10 of the portable terminal corrects the magnetic charge detected by the azimuth sensor according to the angle of inclination detected by the inclination sensor 18, and determines whether external magnetic fields are present based on a comparison of the corrected magnetic charge with the geomagnetic charge referenced from the database.

The portable terminal in the abovementioned embodiments is not restricted to being a cellular phone (including PHS), and may also be a terminal device that is portable and whose location can be shifted, such as a portable information terminal (PDA), or notebook personal computer.

The scope of the present invention is not limited by the embodiments discussed above and applies to inventions noted in the claims and items equivalent thereto.

With the present invention, when a position measurement device using GPS is installed in a portable terminal, it thus becomes possible, even in a case of reduction in the number of satellites acquired, because of the portable terminal being on a street with tall buildings or entering an underground area, to continue positioning and track the position of the portable terminal without causing an unpositionable state to occur.

Further, when an azimuth measurement device is installed in the portable terminal for detecting the direction in which the portable terminal is facing, it can be confirmed whether the detected azimuth is correct by determining if an external magnetic field other than geomagnetism is present.

What is claimed is:

1. A position measurement device comprising:
a position measuring unit for finding two-dimensional position information, at least including latitude and longitude, of a measurement point where the device is presently located on the basis of radio wave information received from satellites; and
a distance measuring unit for measuring a displacement distance, to the device, from an earlier position obtained by said position measuring unit, wherein the earlier position was determined based on radio wave information received from a prescribed number of the satellites, the prescribed number being three or more;
wherein said position measuring unit determines a present position of the measurement point based on both of said displacement distance and radio wave information received from a lesser number of the satellites, wherein the lesser number is less than said prescribed number.

2. The position measurement device, according to claim 1, comprising an acceleration detecting unit for detecting the acceleration in each of three dimensions;
wherein said distance measuring unit measures the displacement distance from the prescribed position measured by said position measuring unit on the basis of said acceleration measured by said acceleration detecting unit.

3. The position measurement device, according to claim 1, wherein said position measuring unit measures the position of said measurement point, based on said displacement distance and two or more pieces of radio wave information received from two or more satellites, the number of which is less than said prescribed number.

4. The position measurement device, according to claim 1, wherein said position measuring unit measures the position of said measurement point, based on said displacement distance and one piece of radio wave information received from one satellite, the number of which is less than said prescribed number.

5. The position measurement device, according to claim 4, wherein said position measuring unit determines the position of the measurement point to be the center of a circle constituting a first position group where a second position group, comprising a set of the positions of the measurement point based on said displacement distance, overlaps a third position group, comprising a set of positions of the measurement point based on said radio wave information.

6. The position measurement device, according to claim 5, wherein said position measuring unit determines the radius of said circle to be an error of said determined position.

7. The position measurement device, according to claim 1, comprising a direction measuring unit for measuring the displacement direction from the prescribed position detected by said position measuring unit;
wherein, said position measuring unit measures the position of the measurement point based on said displacement distance and said displacement direction in the case where not even one piece of radio wave information is received from a satellite.

8. The position measurement device, according to claim 7, comprising an acceleration detecting unit for detecting the acceleration in each of three dimensions;
wherein said direction measuring unit measures said displacement direction on the basis of the acceleration detected by said acceleration detecting unit.

9. The position measurement device, according to claim 7, comprising an angular velocity detecting unit for detecting the angular velocity in each of three dimensions;

wherein said direction measuring unit measures said displacement direction on the basis of the angular velocity detected by said angular velocity detecting unit.

10. A position measurement device comprising:

a position measuring unit for finding two-dimensional position information, at least including latitude and longitude, of a measurement point where the device is presently located on the basis of radio wave information received from satellites; and a distance and direction measuring unit for measuring a displacement distance and a displacement direction, to the device, from an earlier position obtained by said position measuring unit, wherein the earlier position was determined based on radio wave information received from a prescribed number of the satellites, the prescribed number being three or more;

wherein said position measuring unit determines a present position of the measurement point on the basis of both of said displacement distance and said displacement direction, when radio wave information is received from a lesser number of the satellites, wherein the lesser number of which is less than said prescribed number.

11. The position measurement device, according to claim 10, comprising an acceleration detecting unit for detecting the acceleration in each of three dimensions;

wherein said distance measuring unit measures the displacement distance and displacement direction on the basis of the acceleration measured by said acceleration detecting unit.

12. The position measurement device, according to claim 10, comprising:

an acceleration detecting unit for detecting the acceleration in each of three dimensions; and an angular velocity detecting unit for detecting the angular velocity in each of three dimensions;

wherein said distance measuring unit measures the displacement distance on the basis of the acceleration measured by said acceleration detecting unit, and the displacement direction on the basis of the angular velocity detected by said angular velocity detecting unit.

13. The position measurement device according to claim 1, wherein the position measurement device is portable and comprises a terminal.

14. A position measurement method comprising the steps of:

finding two-dimensional position information, at least including latitude and longitude, of a present measurement point on the basis of radio wave information received from satellites;

measuring a displacement distance, to the measurement point, from an earlier position obtained in said step of finding two-dimensional position information, wherein the earlier position was determined based on radio wave information received from a prescribed number of the satellites, the prescribed number being three or more;

determining a present position of the measurement point, based on both of radio wave information received from a lesser number of the satellites, wherein the lesser number is less than said prescribed number, and on said displacement distance.

15. A position measurement device comprising:

a position measuring unit for finding two-dimensional position information, at least including latitude and longitude, of a measurement point on the basis of radio wave information received from a prescribed number, comprising three or more, of satellites, and measuring the position of the measurement point; and a distance measuring unit for measuring a displacement distance from a prescribed position obtained by said position measuring unit;

wherein said position measuring unit measures the position of the measurement point based on of said displacement distance and at least one piece of radio wave information received from the satellites, the number of which is less than said prescribed number, in the case where the number of satellites from which radio wave information can be received is less than said prescribed number wherein said position measuring unit measures the position of said measurement point, based on said displacement distance and one piece of radio wave information received from one satellite, the number of which is less than said prescribed number;

wherein said position measuring unit determines the position of the measurement point to be the center of a circle constituting a first position group where a second position group, comprising a set of the positions of the measurement point based on said displacement distance, overlaps a third position group, comprising a set of positions of the measurement point based on said radio wave information.

16. The position measurement device, according to claim 15, wherein said position measuring unit determines the radius of said circle to be the error of said determined position.

17. The position measurement device, according to claim 1, wherein the prescribed position is a predetermined position and the prescribed number is a predetermined number.

18. The position measurement device, according to claim 10, wherein the prescribed position is a predetermined position and the prescribed number is a predetermined number.

19. The position measurement device, according to claim 13, wherein the prescribed position is a predetermined position and the prescribed number is a predetermined number.

20. The position measurement device, according to claim 14, wherein the prescribed position is a predetermined position and the prescribed number is a predetermined number.

* * * * *